June 9, 1953  J. BARBARO  2,641,379
METHOD OF RELINING BRAKES
Filed May 31, 1950
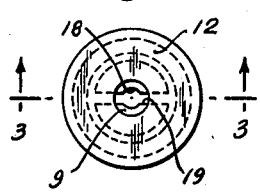
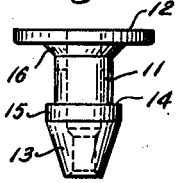
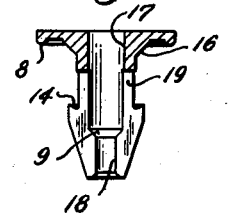
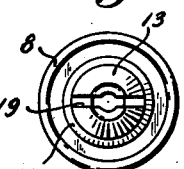
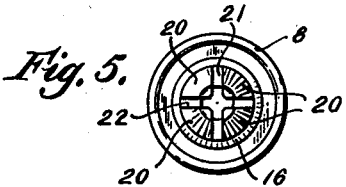
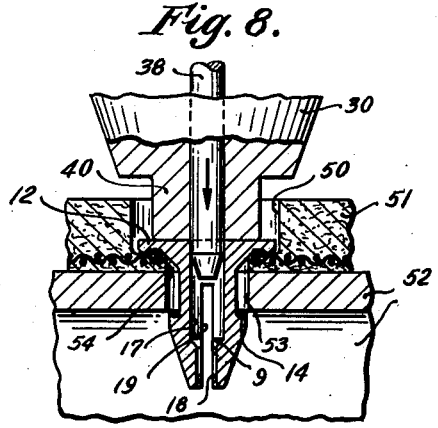
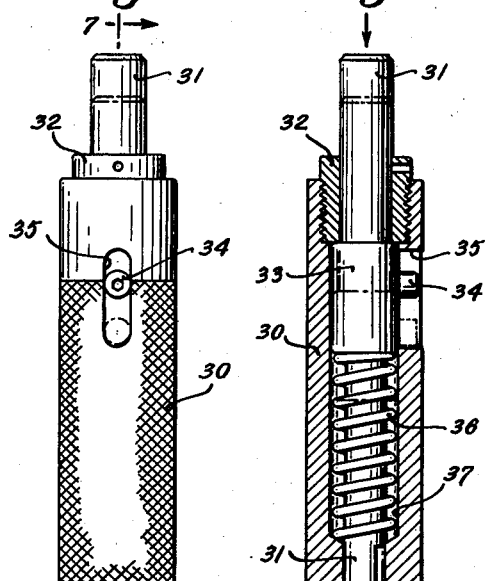
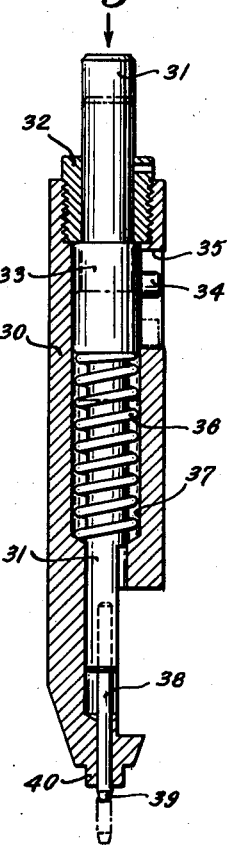
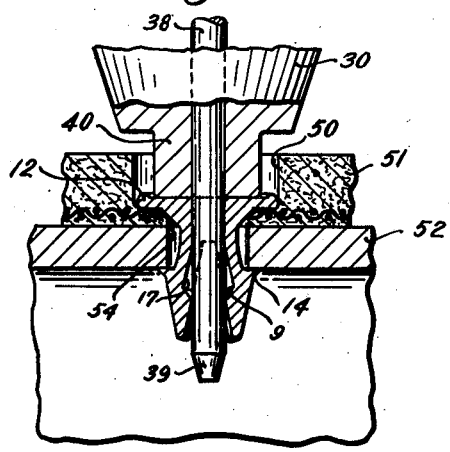
Inventor,
Joseph Barbaro,
by Dike, Porter & Sanborn
Attys.

Patented June 9, 1953

2,641,379

UNITED STATES PATENT OFFICE 2,641,379

METHOD OF RELINING BRAKES

Joseph Barbaro, Boston, Mass.

Application May 31, 1950, Serial No. 165,338

1 Claim. (Cl. 218—29)

My present invention relates to rivets for use in holding brake linings to brake shoes of automobiles, trucks and the like.

Heretofore, as is well known to those skilled in the art, it has been a difficult, time-consuming and expensive job to reline the brakes of an automobile or truck, the linings of which have worn out. In the past it has been necessary to remove the brake shoes, remove the worn linings, secure the new linings and then replace the brake shoes. To do this it has been necessary, among other things, to remove the retracting springs and guide springs, the anchor pins, pivot pins, toggle levers, and in certain cases, the eccentric bolts and nuts. Since in use these parts are subjected to the action of dust, water and air and all unmovable parts are frequently "frozen" in place, this is often a troublesome job and always requires considerable time, skill, and in most shops, the use of special machines not available to the ordinary user.

My invention, which includes a novel rivet, and the method and tool disclosed herein, makes it possible to reline brakes without taking the brake assembly apart, and to do it quickly and without the use of special machines. The work can also be done by the ordinary user or even on the road.

In the drawings:

Fig. 1 is a top plan view of a rivet embodying my invention;

Fig. 2 is a side elevation of the rivet shown in Fig. 1;

Fig. 3 is a section on line 3—3 of Fig. 1, looking in the direction of the arrows;

Fig. 4 is a bottom view of the same rivet;

Fig. 5 is a similar view showing the rivet in slightly modified form;

Fig. 6 is a side elevation of a tool for setting the rivets described herein;

Fig. 7 is a longitudinal section of the tool shown on the line 7—7 of Fig. 6, some of the parts being shown in elevation;

Fig. 8 is a section showing the rivet in place before setting in a brake lining located on a brake shoe or band, a part of the nose and of the setting point of the tool being also shown; and Fig. 9 is a view similar to Fig. 8 showing the position of the parts after the rivet has been set and before the setting point has been withdrawn from the rivet.

All of the figures, except Figs. 6 and 7, are on an enlarged scale so that the construction will be more easily understood.

Referring to the figures, the rivet shown in Figs. 1–4 and 8 and 9 is made from a single piece of metal or other material suitable for the job, which is capable of being bent but yet will have adequate strength for the purposes intended. The rivet consists of a cylindrical body 11, a head 12, and an enlarged hip portion 13 which, as shown in Fig. 2, is an inverted frustum of a cone. The head 12 is formed on its under face with a rib or flange 8. The diameter of the largest portion of the frustum of the hip portion 13 is substantially larger than the cylindrical body of the rivet and, therefore, forms a holding ledge or shoulder 14. In practice I provide a cylindrical portion 15 between the ledge and the base of the frustum for additional strength, and I connect the cylindrical body 11 with the head 12 by a conical portion 16. The rivet is hollow having a cylindrical bore 17 and extending from the top surface of the head 12 to a point below the ledge 14 and a smaller cylindrical bore 18 extending the rest of the way through the rivet. The rivet is also split at the lower end by a diametrical slot 19 extending upward to a point midway of the body. This slot permits the two halves of the point or lower end to be spread outwardly thereby moving said ledge or shoulder portions as will be described. In some cases it is desirable to have the point split into four members 20 by two diametrical slots 21 and 22 located at right angles to each other, as seen in the modified form shown in Fig. 5.

In Figs. 6 and 7 is shown a tool which is conveniently used for setting the rivets. This tool is provided with a body 30 within which is a plunger 31 which projects above the upper end of the tool and is held in the tool by a retaining member 32. On the plunger is a collar 33 having secured thereto a stud 34 movable in slot 35 in the body 30. This stud limits the stroke of the plunger. Spring 36 located in an enlarged bore 37 of the body retains the plunger in its retracted position, as shown in Fig. 7. To the inner end of the plunger 31 is secured a setting point 38, the outer end of which is tapered as shown at 39. The body 30 is also provided with a cylindrical nose 40 of a diameter slightly smaller than the diameter of the head of the rivet with which it is to be used.

To set the rivet shown in Figs. 1–4, the rivet is placed in the hole 50 in the brake lining 51 shown in section in Figs. 8 and 9. The hole 50 is counter-bored to a diameter large enough to receive the head 12 of the rivet. In the brake band 52 there is the usual rivet hole 53 which is the same size as the rivet hole 54 in the brake lining below the counter-bore 50. When the rivet is inserted in the counter-bore 50 in the brake lining 51, its pointed end passes through the hole 53 in the brake shoe or band 52. The parts are then in the position shown in Fig. 8. The tool is then inserted with the point 38 in the bore 17 of the rivet, and the plunger 31 is struck lightly with a hammer. This forces the setting point 39 downward into the small bore 18. As the tapered nose 39 of the setting point passes the tapered surface 9 which joins the two bores in the rivet, the two halves of the lower point of the rivet, or if the rivet is in the form shown in Fig. 5 the four parts 20, are forced apart, with the result that the ledge 14 is moved outwardly into a position under and engaging the edges of the brake shoe or band 52 around the hole or aperture 53. At the same time the nose 40 of the tool crowds the flange 8 on the underside of the head 12 down onto the brake band, and the further outward movement of the two halves of the rivet being then in contact with the surface of the brake shoe or band, tend to pull the rivet down and tighten the set of the head of the rivet against the brake band.

From the above it will be seen that the rivet may be set by dropping it into the hole, inserting the tool, and striking the tool lightly with a hammer, and that no anvil on the inside of the brake shoe or band is required, since the head of the tool resists the tendency of the rivet to be carried downward by the tools.

Therefore to install a new brake lining on an automobile or truck, it is only necessary to take off the wheel and brake drum exposing the worn brake band and the under or inside of the brake shoe or band, then remove the old worn brake lining by cutting off the rivets or prying the parts apart and by punching out the stumps of the old rivets. The new brake lining can then be laid in place with the holes or apertures in the brake shoe or band in register with the counterbored holes in lining and the rivets inserted with the heads in contact with the bottom surface of the counterbore and the shank projecting through the registering or aligned aperture of the brake element as shown in Fig. 8. They are then set with the tool, shown in Figs. 6 and 7. In this way it is possible to install new brake linings without disturbing the brake operating mechanism at all, and the necessity of taking out pivot pins which may be rusted in and be difficult to remove is obviated. Also all danger that the parts will not be restored to their proper position is eliminated.

I claim:

The method of relining automobile wheel brakes which comprises the steps of removing the wheel and brake drum only and thereafter removing the worn brake lining and rivets from the exposed brake shoe, placing a brake lining provided with counterbored holes in contact with the apertured brake shoe, with the counterbored holes in alignment with the apertures of the brake shoe and with the counterbore of the holes facing away from said brake shoes, inserting a rivet into each of the counterbored holes, said rivet having a head and shank depending therefrom with a bore extending axially through said head and shank which is tapered inwardly in the direction of the terminal end of said shank, said rivet being positioned with the head thereof in contact with the bottom surface of the counterbore of the hole, and the shank projecting through the aligned aperture of said brake shoe, the shank of each of said rivets being slotted entirely through said shank at its terminal end in a radial direction and being provided with shoulders on the exterior of the shank intermediate the length of said slotted portion and positioned in spaced relation to the terminal end of said shank, said shoulders, after insertion of the rivet, projecting with but slight clearance beyond said brake shoe, spreading said slotted rivet shank by inserting a member within the tapered bore of each rivet to spread the terminal end thereof and thereby move the shoulders of the rivet outwardly into tight securing engagement with the brake shoe around the aperture therein.

JOSEPH BARBARO.

References Cited in the file of this patent

UNITED STATES PATENTS

| Number | Name | Date |
|---|---|---|
| 1,452,475 | Sardeson | Apr. 17, 1923 |
| 2,246,888 | Messenger | June 24, 1941 |
| 2,298,552 | DuVall | Oct. 13, 1942 |
| 2,301,244 | Bishop | Nov. 10, 1942 |

FOREIGN PATENTS

| Number | Country | Date |
|---|---|---|
| 563,295 | Great Britain | Aug. 8, 1944 |